June 26, 1923.  
H. P. KRAFT  
VALVE CAP  
Filed April 3, 1920  
1,460,250

INVENTOR:  
Henry P. Kraft  
By Attorneys,

Patented June 26, 1923.

1,460,250

UNITED STATES PATENT OFFICE.

HENRY P. KRAFT, OF RIDGEWOOD, NEW JERSEY.

VALVE CAP.

Application filed April 3, 1920. Serial No. 370,996.

*To all whom it may concern:*

Be it known that I, HENRY P. KRAFT, a citizen of the United States of America, residing in Ridgewood, in the county of Bergen and State of New Jersey, have invented certain new and useful Improvements in Valve Caps, of which the following is a specification.

This invention relates to valve caps or the like and aims to provide certain improvements therein.

The invention is particularly directed to a valve cap intended for heavy duty and particularly adapted for large truck tire valves wherein high pressures are used.

In its preferred form the invention comprises a cap structure having an internal thread and an internal gasket, the gasket being seated upon a swivel member of novel construction. The invention also includes such a cap with a skirt or protecting portion for the valve threads.

Referring to the drawings which illustrate the preferred form of the invention—

Figure 1:
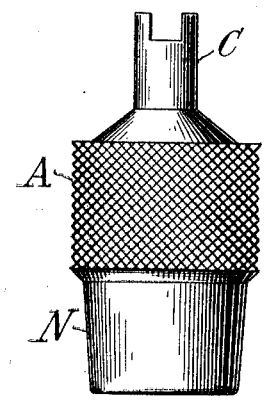
Figure 1 is an elevation of the cap.

Referring to the drawings, let A indicate the cap as a whole which is provided with an internal thread B designed to screw over the end of a valve shell. In valves for truck tires as now constructed, the valve casing has no nipple such as is customary in other valves, the nipple being omitted and the full available diameter of the shell being utilized to receive a large size valve check, usually of standard design. The cap also is best provided with a screw-driver projection C intended to be utilized to screw and unscrew the insides or working parts.

Figure 2:
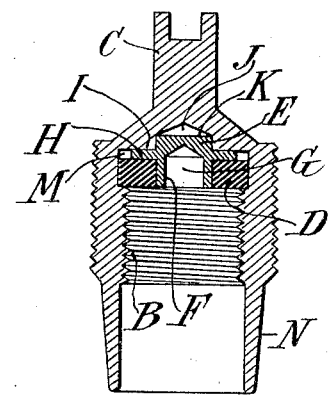
Fig. 2 is a diametrical section.
Figure 3:
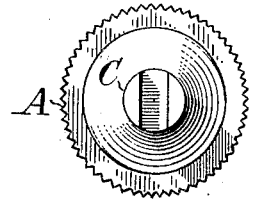
Fig. 3 is a top or plan view.
Figure 4:
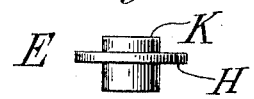
Fig. 4 is an elevation of the swivel member detached.
Figure 5:
Fig. 5 is an elevation of the packing washer.

Within the valve cap is arranged a packing washer D shown detached in Fig. 5. In caps of the size required for truck tire valves, there is a very considerable pressure placed upon the packing washer with the result that it is easily distorted. According to the present invention, the packing washer D is made as large and thick as possible and it is mounted in a swivel member E, the latter comprising a tubular flange F adapted to enter in the central recess of the packing washer and to provide on its interior, a recess G designed to receive the end of the deflating pin of the valve. The swivel member E is also formed with an annular flange H which is adapted to rest against a bearing face I at the upper part of the cap, and the cap is also provided with a central recess J designed to receive a circular boss K as best seen in Fig 2. The result of this construction is that the swivel member has a central bearing face as well as an annular flange which forms a bearing on the interior of the cap. The member E provides an adequate swivel for the packing D, and at the same time, by means of the flange F, the packing is prevented from distorting inwardly.

The cap is preferably provided with an annular recess M in which the packing extends and which thus holds the packing and the swivel member within the cap. By providing the swivel member E with a boss K, I not only obtain a better swiveling of the parts, but will also center the swivel member within the cap without necessitating that the flange H shall extend outwardly within the annular groove M. The flange H might be cupped to decrease the diameter of the swivel member and by an operation subsequent to insertion, the flange might be straightened so as to extend within the annular recess M, thus centering the swivel member. This would not only require an additional operation, but also an operation which is best avoided in dealing with heavier constructions such as is contemplated by the present invention. By the present construction, the swivel member may be accurately formed and introduced in the cap without a subsequent bending operation and yet remain accurately centered in use.

I have preferred to provide a skirt or projecting portion N below the screw-threaded portion of the cap which overlaps the end of the valve to a certain extent and protects the same from incidental injury to the threads.

While I have shown and described one form of the invention, it will be understood that I do not wish to be limited thereto, since various changes may be made therein without departing from the spirit of the invention.

What I claim is:—

1. A cap for valves, or the like, having a screw-threaded interior, a swivel member carrying a packing washer within said cap above said screw-threaded portion, said swivel member having a substantially flat bearing face contacting with the interior of the cap and of a diameter less than that of the screw threads, whereby the swivel member and packing washer may be inserted into the cap as a unit through the open end thereof and held therein by the action of the packing washer.

2. A cap for valves, or the like, having a screw-threaded interior surmounted by an enlarged annular groove, a swivel member in said cap having both a cylindrical and a flat bearing contact with the interior of the cap, the flat bearing portion thereof being of an external diameter to enter the open end of the cap, and a packing washer carried by said swivel member for maintaining it within the cap.

3. A cap for valves or the like having a screw-threaded interior, a recess leading to said interior, a swivel member having a central boss in said recess, and a substantially flat flange surrounding said boss, a depending flange on the underside of said swivel member, and a packing washer positioned around said depending flange and contacting with the side wall of the cap to hold the swivel member within the recess.

4. A cap for valves or the like having a screw-threaded interior, an annular groove above the screw-thread, a cylindrical recess leading to said interior, a swivel member having a central boss in said recess, a flange beneath said boss, said flange being of a diameter to be inserted through said screw-threaded portion, a depending flange on the underside of said swivel member, and a packing washer surrounding said depending flange, and being of an external diameter to enter said annular groove, whereby said packing washer holds said swivel member in said cap.

In witness whereof, I have hereunto signed my name.

HENRY P. KRAFT.